United States Patent
Williams et al.

(10) Patent No.: US 9,860,483 B1
(45) Date of Patent: Jan. 2, 2018

(54) SYSTEM AND METHOD FOR VIDEO PROCESSING SOFTWARE

(75) Inventors: Kevin C. Williams, Edmond, OK (US); Michael J. Sullivan, Rancho Santa Margarita, CA (US); Louis Wilder, III, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 651 days.

(21) Appl. No.: 13/473,823

(22) Filed: May 17, 2012

(51) Int. Cl.
H04N 7/01 (2006.01)
H04N 19/42 (2014.01)
H04N 21/2343 (2011.01)

(52) U.S. Cl.
CPC ............ H04N 7/01 (2013.01); H04N 19/42 (2014.11); H04N 21/2343 (2013.01)

(58) Field of Classification Search
None
See application file for complete search history.

(56) References Cited

U.S. PATENT DOCUMENTS

| | | | | |
|---|---|---|---|---|
| 5,519,438 A * | 5/1996 | Elliott | ............ | H04N 9/641 348/180 |
| 5,646,866 A * | 7/1997 | Coelho | ............ | G06F 9/44 345/502 |
| 5,701,312 A * | 12/1997 | DeLuca | ............ | H04L 1/189 714/748 |
| 6,134,221 A * | 10/2000 | Stewart | ............ | H04W 24/00 370/242 |
| 7,640,083 B2 * | 12/2009 | Monroe | ............ | 701/9 |
| 7,765,539 B1 * | 7/2010 | Elliott | ............ | G06F 8/53 717/145 |
| 2002/0154214 A1 * | 10/2002 | Scallie | ............ | G02B 27/017 348/51 |
| 2003/0033449 A1 * | 2/2003 | Frantz | ............ | H04N 21/8193 710/1 |
| 2004/0053691 A1 * | 3/2004 | Kawase | ............ | A63F 13/10 463/33 |

(Continued)

OTHER PUBLICATIONS

Hancock et al., Architecture Supporting Multiple Video Formats, Jan. 1, 1996, IBM Technical Disclosure Bulletin vol. 39 No. 1.*

(Continued)

*Primary Examiner* — Gims Philippe
*Assistant Examiner* — Stefan Gadomski
(74) *Attorney, Agent, or Firm* — Kunzler, PC

(57) ABSTRACT

System and method for processing video information are disclosed and may include receiving, at a processing device, packetized digital video from a sensor. The packetized digital video may be decoded within the processing device, into source video formatted frames. The decoding may use at least one shared library function call. The source video formatted frames may be converted within the processing device into destination video formatted frames. The destination video formatted frames may be transferred to a video processing system. The destination video formatted frames may be stored, prior to the transferring, in shared memory within the processing device. The storing of the destination video formatted frames may include allocating at least one memory block of the shared memory, and associating the allocated at least one memory block with a memory pointer.

19 Claims, 16 Drawing Sheets

(56) References Cited

U.S. PATENT DOCUMENTS

| | | | |
|---|---|---|---|
| 2005/0076134 A1* | 4/2005 | Bialik | H04N 7/17336 709/230 |
| 2005/0166214 A1* | 7/2005 | Kaulgud | G06F 3/1431 719/321 |
| 2005/0251806 A1* | 11/2005 | Auslander et al. | 718/100 |
| 2006/0009290 A1* | 1/2006 | Taho | A63F 13/10 463/43 |
| 2006/0055781 A1* | 3/2006 | Yi et al. | 348/207.1 |
| 2006/0098017 A1* | 5/2006 | Tarditi, Jr. | G06F 8/45 345/505 |
| 2007/0129146 A1* | 6/2007 | Tzruya | G06F 9/4443 463/42 |
| 2007/0130292 A1* | 6/2007 | Tzruya | G06F 9/4426 709/219 |
| 2008/0123527 A1* | 5/2008 | Shahidi | H04L 69/28 370/231 |
| 2008/0130039 A1* | 6/2008 | Igarashi | G06F 3/1242 358/1.15 |
| 2008/0145031 A1* | 6/2008 | Tanaka | G11B 27/005 386/335 |
| 2008/0204445 A1* | 8/2008 | Jin et al. | 345/418 |
| 2009/0082102 A1* | 3/2009 | Sargaison | G06F 9/45537 463/31 |
| 2009/0083753 A1* | 3/2009 | Tzruya | G06F 9/4843 718/107 |
| 2009/0119087 A1* | 5/2009 | Ang | G06F 9/45558 703/23 |
| 2009/0276782 A1* | 11/2009 | Wang | G06F 9/5011 718/103 |
| 2010/0064324 A1* | 3/2010 | Jenkin | H04N 21/443 725/59 |
| 2010/0242073 A1* | 9/2010 | Gordon et al. | 725/98 |
| 2011/0080519 A1* | 4/2011 | Chowdhry | H04N 19/115 348/453 |
| 2011/0157196 A1* | 6/2011 | Nave | G06F 9/4445 345/522 |
| 2011/0296046 A1* | 12/2011 | Arya | H04L 65/80 709/231 |
| 2012/0076197 A1* | 3/2012 | Byford | H04N 19/00 375/240.01 |
| 2012/0142425 A1* | 6/2012 | Scott | A63F 13/12 463/42 |
| 2013/0007552 A1* | 1/2013 | Sugiura | H04L 1/0041 714/752 |
| 2013/0038790 A1* | 2/2013 | Seetzen | G09G 5/02 348/453 |
| 2013/0170540 A1* | 7/2013 | Damkat | G09G 3/3426 375/240.01 |

OTHER PUBLICATIONS

Berners-Lee, Uniform Resource Identifier (URI): Generic Syntax, The Internet Society, Jan. 2005.*

Jones, "Anatomy of Linux dynamic libraries", IBM Corporation, Aug. 2008.*

* cited by examiner

SYSTEM AND METHOD FOR VIDEO PROCESSING SOFTWARE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD

Certain embodiments of the disclosure relate generally to processing of video signal. More specifically, certain embodiments of the disclosure relate to a system and method for retrofit to legacy video processing software with modern video source.

BACKGROUND

Many existing video processing systems utilize legacy video processing software for processing video signals from an analog video source. Most often, the video signals are low resolution signals since they are generated by a legacy video sensor (or a video source). Additionally, such low resolution video signals are communicated to the video processing system using analog distribution methods, requiring multiple analog-to-digital (A/D) and digital-to-analog (D/A) conversions, which further deteriorate the video signal.

With the modernization of video technology, legacy video sensors are now being replaced by more advanced, high-fidelity sensors and modern video sources, which are able to provide improved high resolution digital video signals. However, the existing video processing systems are not able to process such digital video signals without substantial (and expensive) modifications to the legacy video processing software already in place and in use by end users. More specifically, such modifications to the legacy video processing software may require, for example, a complete software redesign, additional video processing software development, new operator training, and new video processing system safety qualification and support.

Accordingly, there is a need for systems and methods for retrofit to legacy video processing software with modern video source. Further limitations and disadvantages of conventional and traditional approaches will become apparent to one of skill in the art, through comparison of such systems with the present disclosure as set forth in the remainder of the present application with reference to the drawings.

BRIEF SUMMARY

A system and method for retrofit to legacy video processing software with modern video source, substantially as shown in and/or described in connection with at least one of the figures, are therefore provided with embodiments that address at least some of the deficiencies identified above.

Modern video processing enables a system to take advantage of the high resolution digital video provided by new sensors and video sources. Present network-centric systems are designed to support distributed streaming digital video sources. However, analog video distribution (used by the legacy sensors) requires expensive modifications to install wiring, amplifiers and lossy redundant A/D conversions. The present disclosure enables a software system limited to legacy analog video processing to process modern streaming video formats. This is achieved with the use of a retrofit adapter (RA), without design or code changes to the core legacy video processing software. The retrofit adapter may be implemented as, for example, a software module that utilizes a shared library (e.g., a dynamically linked library (DLL) and/or a statically linked library) interface in the legacy video processing software to transparently enable modern video processing. The retrofit adapter may provide two main functions—streaming video decoding and legacy video driver emulation.

In one aspect, a method for processing video information may include receiving, at a processing device, packetized digital video from a sensor. The packetized digital video may be decoded, within the processing device into source video formatted frames, using at least one shared library function call. The source video formatted frames may be converted, within the processing device, into destination video formatted frames. The destination video formatted frames may be transferred to a video processing system. The at least one shared library function call may include a dynamically linked library (DLL) function call and/or a statically linked library function call. The source video formatted frames may include RGB formatted digital video frames, and the destination video formatted frames may include device independent bitmap (DIB) formatted video frames. The destination video formatted digital video frames may be generated by decoding, within the processing device, the packetized digital video into the destination video formatted digital video frames, using the at least one shared library function call. The generating may take place without the converting. In other words, in another embodiment of the disclosure, no conversion may be necessary since the decoded source video formatted frames might already be natively compatible with the video processing system.

The destination video formatted frames may be stored, prior to the transferring, in shared memory within the processing device. The storing of the destination video formatted frames may include allocating at least one memory block of the shared memory, and associating the allocated at least one memory block with a memory pointer (e.g., a reference to the starting memory address of the destination video formatted frames stored in the shared memory). The memory pointer may be provided by the video processing system. In another embodiment of the disclosure, the reference to the starting memory address of the destination video formatted frames may be provided to the video processing system.

The destination video formatted frames may be transferred from the allocated at least one memory block to the video processing system, and then may be post-processed by the video processing system. The post-processed transferred destination video formatted frames may be displayed by the video processing system. The converting of the source video formatted frames into the destination video formatted frames may use the at least one shared library function call. The converting may include converting the source video formatted frames into a video format compatible with the video processing system. The at least one shared library function call may include at least one of an Initialization function call and a Draw function call.

In another aspect, embodiments of the disclosure may include a non-transitory machine-readable storage medium having stored thereon, a computer program having at least one code section for processing video information, the at least one code section being executable by a machine for causing the machine to perform any of the method steps described herein.

In still another aspect, embodiments of the disclosure may include a system for processing video information, the system including at least one processor within a processing device. The at least one processor may be operable to receive packetized digital video from a sensor. The at least one processor may be operable to decode, within the processing device, the packetized digital video into source video formatted frames, using at least one shared library function call. The at least one processor may be operable to convert, within the processing device, the source video formatted frames into destination video formatted frames. The at least one processor may be operable to transfer the destination video formatted frames to a video processing system.

The at least one shared library function call may include a dynamically linked library (DLL) function call and/or a statically linked library function call. The source video formatted frames may include RGB formatted digital video frames, and the destination video formatted frames may include device independent bitmap (DIB) formatted video frames. In a different embodiment of the disclosure, formats other than RGB and DIB may be used as source and destination video frame format, respectively. The at least one processor may be operable to generate the destination video formatted digital video frames by decoding, within the processing device, the packetized digital video into the destination video formatted digital video frames, using the at least one shared library function call. The generating may take place without any of the converting. In other words, in another embodiment of the disclosure, no conversion may be necessary since the decoded source video formatted frames might already be natively compatible with the video processing system.

The at least one processor may be operable to store, prior to the transfer, the destination video formatted frames in shared memory within the processing device. During the storing of the destination video formatted frames, the at least one processor may be operable to allocate at least one memory block of the shared memory, and associate the allocated at least one memory block with a memory pointer (e.g., a reference to the starting memory address of the destination video formatted frames stored in the shared memory). The memory pointer may be provided by the video processing system. In another embodiment of the disclosure, the reference to the starting memory address of the destination video formatted frames may be provided to the video processing system.

The destination video formatted frames may be transferred from the allocated at least one memory block, and the at least one processor may be operable to post-process the transferred destination video formatted frames. The at least one processor may be operable to display the post-processed transferred destination video formatted frames. The converting of the source video formatted digital video frames into the destination video formatted frames may use the at least one shared library function call. During the converting, the at least one processor may be operable to convert the source video formatted digital video frames into a video format compatible with the video processing system. The at least one shared library function call may include at least one of an Initialization function call and a Draw function call.

The features, functions, and advantages that have been discussed can be achieved independently in various embodiments or may be combined in yet other embodiments, further details of which can be seen with reference to the following description and drawings.

BRIEF DESCRIPTION OF SEVERAL VIEWS OF THE DRAWINGS

Preferred and alternate embodiments of the present disclosure are described in detail below with reference to the following drawings, which are not necessarily drawn to scale.

DETAILED DESCRIPTION

Certain aspects of the disclosure may be found in a system and method for retrofit to legacy video processing software with modern video source. In one aspect, a method for processing video information may include receiving, at a processing device, packetized digital video from a sensor. The packetized digital video may be decoded, within the processing device into source video formatted frames, using at least one shared library function call. The at least one shared library function call may include a dynamically linked library (DLL) function call and/or a statically linked library function call. The source video formatted frames may be converted, within the processing device, into destination video formatted frames. The destination video formatted frames may be transferred to a video processing system.

Many specific details of certain embodiments of the disclosure are set forth in the following description as well as the drawings to provide a thorough understanding of such embodiments. One skilled in the art, however, will understand that the present disclosure may have additional embodiments, or that the present disclosure may be practiced without several of the details described in the following description. Like numbers refer to like elements throughout.

Figure 1:
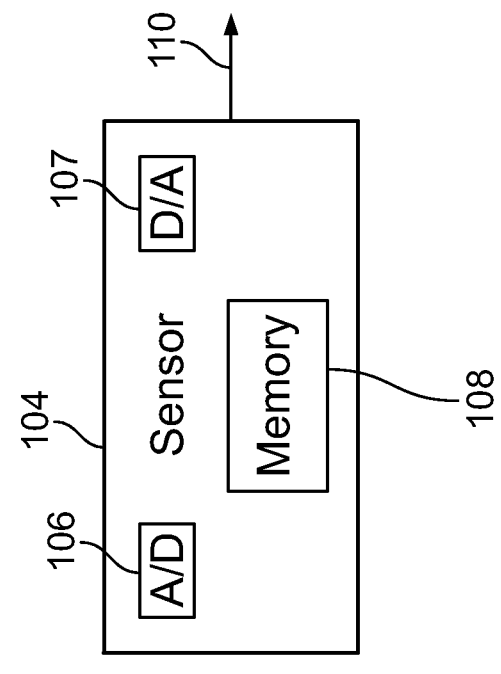
FIG. 1 is an illustration of a legacy sensor.
Figure 1:
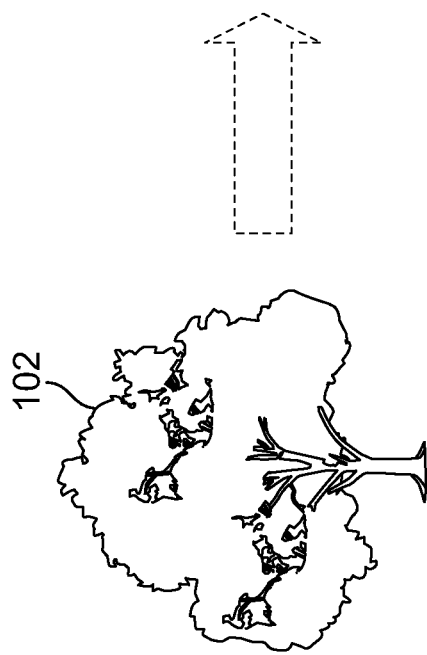

FIG. 1 is an illustration of a legacy sensor. Referring to FIG. 1, the legacy sensor 104 may comprise suitable logic, circuitry, interfaces, and/or code that may be operable to detect and sample the objective 102 (usually in low resolution). Additionally, the legacy sensor 104 may comprise on-chip memory 108 for storing sampled video data (e.g., video data of the objective 102), as well as an A/D converter 106 and a D/A converter 107.

In operation, the legacy sensor 104 may initially sample the analog source (e.g., objective 102) by converting analog video data of the objective 102 into digital video data using the A/D converter 106. The digital video data may be stored in the memory 108. In instances when the legacy video sensor 104 is used with a video processing system, the stored digital video data may be converted back to analog video data using the D/A converter 107. The resulting analog video data may be output for subsequent processing via the communication link 110.

However, the fidelity of digital representation of the analog source (e.g., the stored digital video data of the objective 102) is directly related to the sampling rate of the legacy sensor 104, and is inherently lossy. Additionally, the digital video data generated by the A/D converter 106 is further deteriorated by the second conversion by the D/A converter 107. Because of such inherent signal data loss, the primary goal in modern video processing systems (VPSs) is to minimize the number of analog-to-digital (A/D) and digital-to-analog (D/A) conversions.

Figure 2:
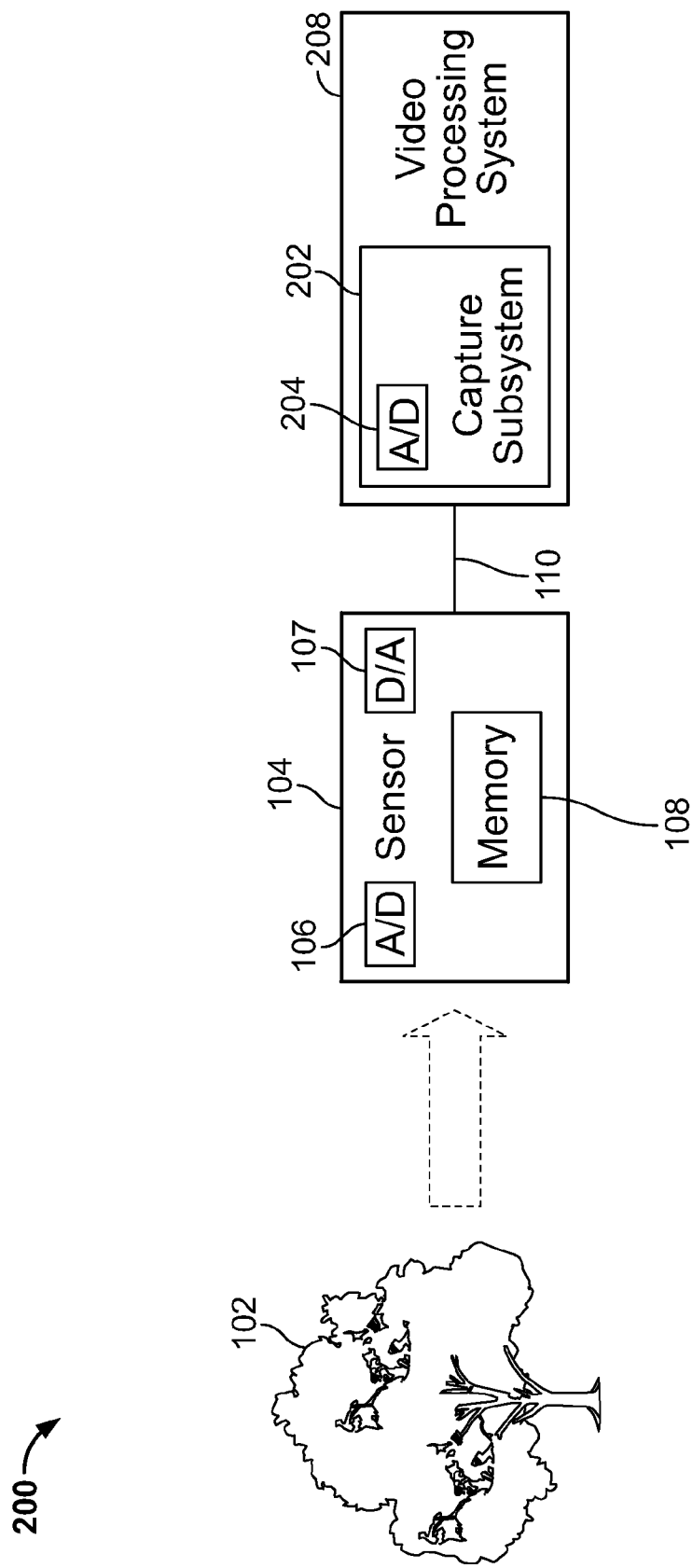
FIG. 2 is an illustration of a video processing system using legacy sensor and legacy video processing software.

FIG. 2 is an illustration of a video processing system using legacy sensor and legacy video processing software. Referring to FIG. 2, there is illustrated a processing environment 200, which may comprise a legacy sensor 104, a capture subsystem 202, and a video processing system 208.

The legacy sensor 104 may comprise suitable logic, circuitry, interfaces, and/or code that may be operable to detect and sample the objective 102. Additionally, the legacy sensor 104 may comprise on-chip memory 108 for storing sampled video data (e.g., video data of the objective 102), as well as an A/D converter 106 and a D/A converter 107.

The capture subsystem 202 may comprise suitable logic, circuitry, interfaces, and/or code and may be adapted to perform the analog capture function associated with the analog video data received via the communication link 110. More specifically, the capture subsystem 202 may be implemented within the video processing system 208 and may be adapted to digitize the received analog video data into a raw, digital data stream using the A/D converter 204. The capture subsystem 202 may then perform video decoding and convert the digital data stream (e.g., by using a color space converter) into video data that conforms with any of several color space standards, such as RGB and YCbCr. Additionally, the capture subsystem 202 may also be adapted to perform additional conversion of the RGB formatted video data into one or more video standards that are compatible with the video processing system 208.

The video processing system 208 may comprise suitable logic, circuitry, interfaces, and/or code and may be adapted to receive video data formatted by the capture subsystem 202. For example, the video processing system 208 may comprise a PC, a laptop or an embedded computer running video processing software (see e.g., FIG. 3), and may be adapted to post-process and/or display the video data received from the capture subsystem 202. The capture subsystem 202 may be a video capture card, adapted for use with the video processing system 208. An exemplary operation sequence is explained in greater detail herein below, in reference to FIG. 3.

Figure 3:
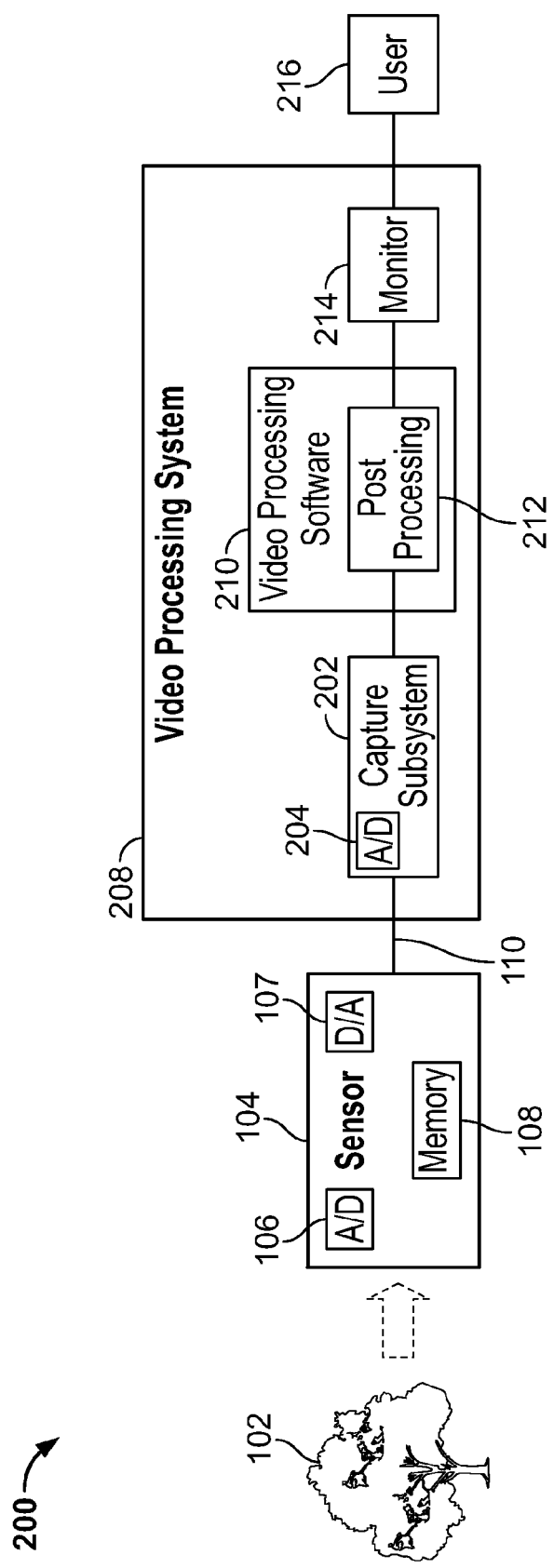
FIG. 3 is another illustration of the video processing system of FIG. 2, using a legacy sensor and legacy video processing software.

FIG. 3 is another illustration of the video processing system of FIG. 2, using a legacy sensor and legacy video processing software. Referring to FIG. 3, the video processing system 208 may be running video processing software 210, as part of its operating system. The video processing software 210 may be adapted to provide additional post-processing functions 212 within the video processing system 208, at the direction of a user 216.

In an exemplary operation sequence of the processing environment 200, the legacy sensor 104 may sample the objective 102 and generate digital video data using the A/D converter 106. Such data may be temporarily stored within the on-chip memory 108. Since the video processing system 208 uses video processing software 210, the stored digital video data may be converted back to analog video data using the D/A converter 107. The resulting analog video data may be sent to the capture subsystem 202 using the communication link 110. The capture subsystem 202 may then digitize the received analog video data into a raw, digital data stream using the A/D converter 204. The capture subsystem 202 may then perform video decoding and convert the decoded digital data stream into a source video frame format such as, for example, RGB formatted video data. Additionally, the capture subsystem 202 may perform additional conversion of the source video formatted frames into one or more additional video standards that are compatible with the video processing software 210. The resulting converted video data may be post-processed by the post-processing functions 212 and/or displayed on the monitor 214 at the direction of the user 216.

As seen in FIG. 3, the processing environment 200 utilizes at least three signal conversions (A/D converters 106, 204 and D/A converters 107), which results in a lossy video signal provided to the video processing software 210. Additionally, the legacy sensor 104 provides only low resolution video data. In an exemplary embodiment of the disclosure, the processing system may be improved by using a modern video sensor (or another modern video source), which may provide high definition (HD) video and may no longer support analog video transport. In this regard, by using a modern video sensor in place of the legacy video sensor 104, at least two of the three conversions (namely, D/A converter 107 and A/D converter 204) may be avoided, thereby improving video data quality.

However, the capture subsystem 202 and the video processing software 210 are not designed to receive and process a digital video signal output directly from a modern video sensor. In an exemplary embodiment of the disclosure, costly redesign of the video processing software 210 may be avoided by using the interface between the video processing software 210 and the capture subsystem 202 to support a modern digital video source (e.g., a modern sensor). More specifically, a retrofit adapter (RA) (see e.g., FIG. 4A below) may be used in place of the capture subsystem 202 so that the video processing software 210 may process digital signals received from a modern video source, such as a high fidelity digital video sensor (or a modern sensor).

Figure 4A:
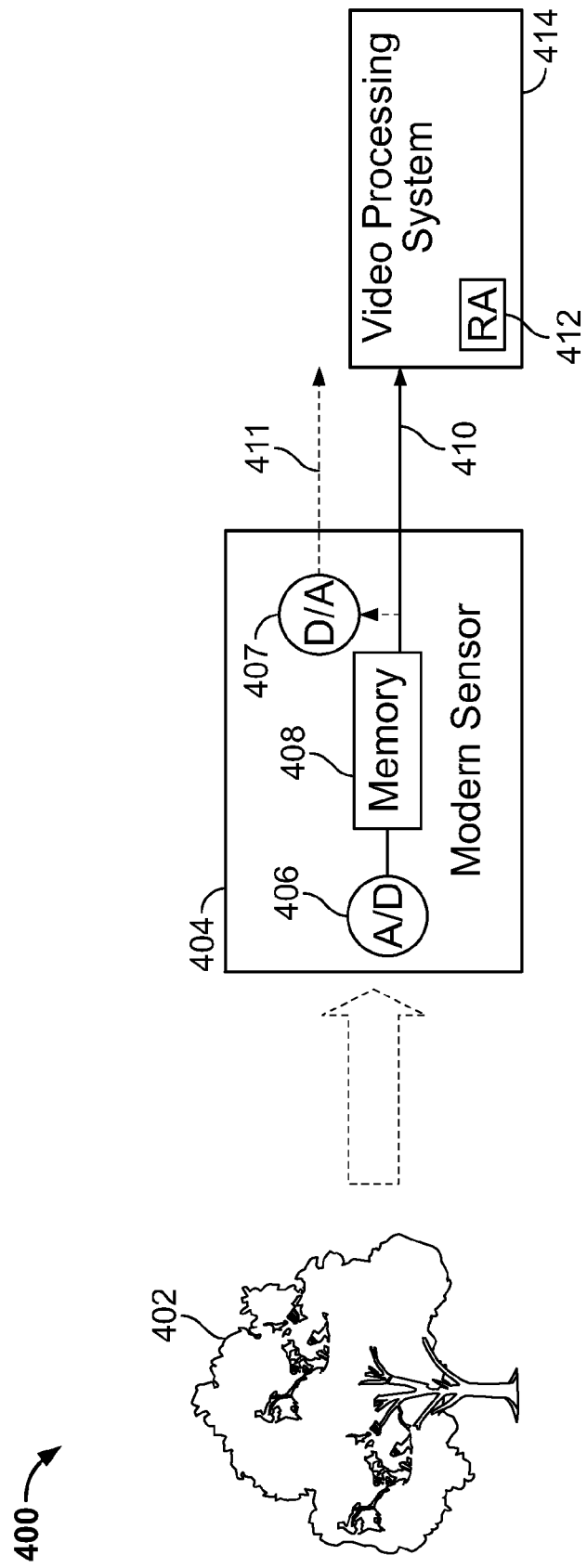
FIG. 4A is an illustration of a high fidelity digital video sensor, which can be used as a modern video source, in accordance with an embodiment of the disclosure.

FIG. 4A is an illustration of a high fidelity digital video sensor, which can be used as a modern video source, in accordance with an embodiment of the disclosure. Referring to FIG. 4A, the processing environment 400 may comprise a high fidelity digital video sensor (or a modern sensor) 404, a retrofit adapter 412, and a video processing system 414.

The modern sensor 404 may comprise suitable logic, circuitry, interfaces, and/or code that may be operable to detect and sample the objective 402 using the A/D converter 406 (usually in high resolution), generating a high definition (HD) digital video data. Additionally, the modern sensor 404 may comprise on-chip memory 408 for storing the HD digital video data, as well as an optional D/A converter 407 for providing an analog video output 411, if needed for analog video signal processing.

The video processing system 414 may comprise suitable logic, circuitry, interfaces, and/or code and may be adapted to receive via the communication link 410, HD digital video data directly from the modern sensor 404. The video processing system 414 may further comprise video processing software (e.g., 212 in FIG. 3 or 502 in FIG. 5A), which may use the retrofit adapter (RA) 412 for processing the HD digital video signals received via the communication link 410. In an exemplary embodiment of the disclosure, the modern sensor 404 may encode/compress (prior to communicating via the communication link 410) the HD digital video data using one or more video standards, such as M-JPEG, MPEG-2, H/264/MPEG-4 Part 10 (or AVC), or any other suitable video encoding/compression standard.

The RA 412 may comprise suitable logic, circuitry, interfaces, and/or code and may be used to emulate the functionalities typically performed by the capture subsystem (e.g., 202 in FIG. 3). More specifically, the RA 412 may receive the HD digital video data from the modern sensor 404, decode it into source video formatted frames, and then convert the source video formatted frames into one or more other video formats suitable for processing by the video processing software (e.g., 212 in FIG. 3 or 502 in FIG. 5A). In an exemplary embodiment of the disclosure, the RA 412 may convert the source video formatted frames to destination video formatted frames (e.g., device independent bitmap (DIB) formatted video data, as explained in greater detail in reference to FIG. 4B below) for processing by the video processing software (e.g., 212 in FIG. 3 or 502 in FIG. 5A). In this regard, the processing environment 400 may use only a single conversion (A/D converter 406 within the modern sensor 404) in order to generate and process an HD video signal using video processing software with a retrofit adapter 412. Additional description of the interface between the modern sensor 404 and the RA 412, as well as the interface between the RA 412 and the video processing software within the video processing system 414 is further provided in reference to FIGS. 5-7 below.

Figure 4B:
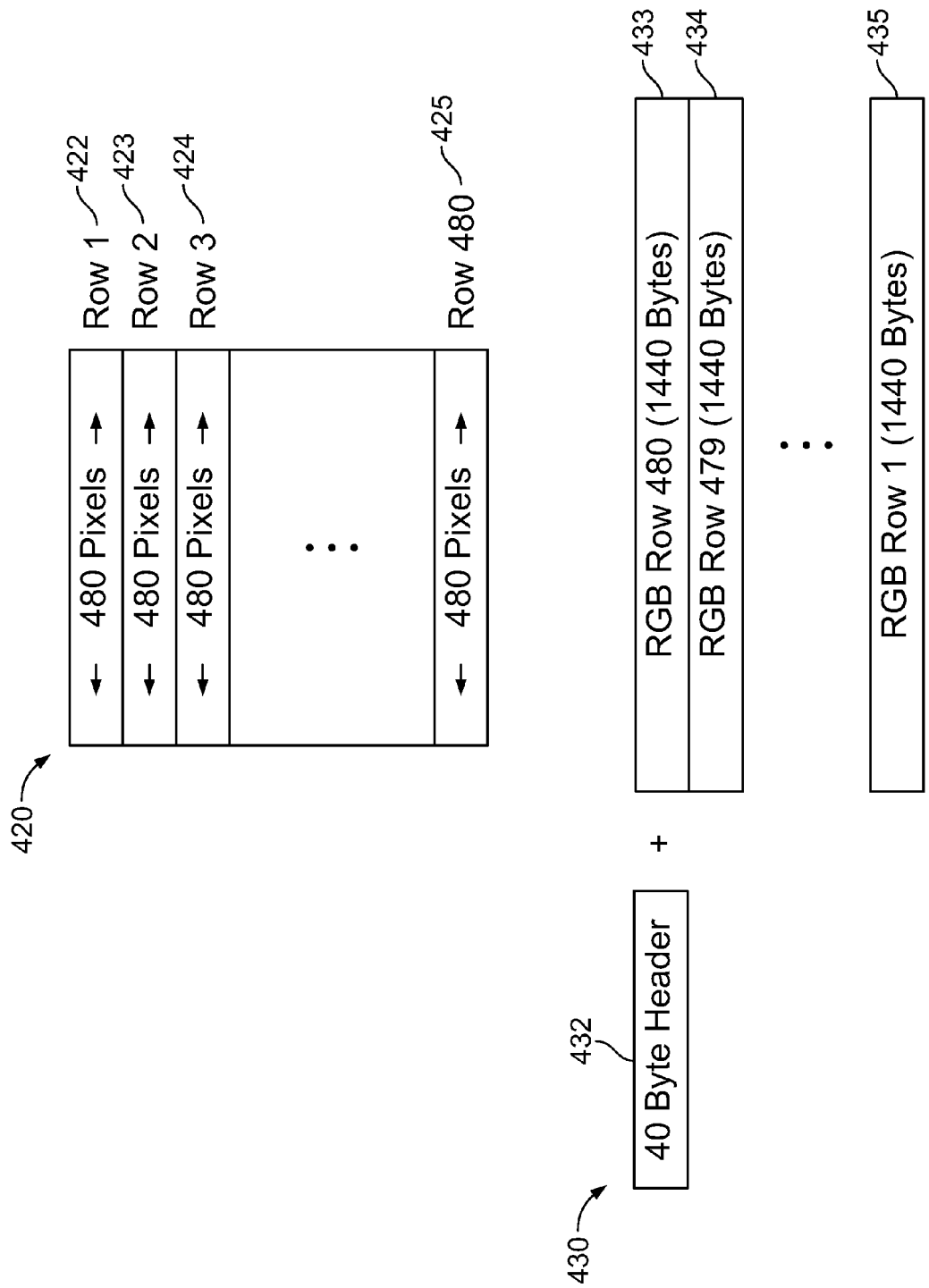
FIG. 4B is a diagram of an exemplary RGB video frame and a Device Independent Bitmap (DIB) frame.

FIG. 4B is a diagram of an exemplary RGB video frame and a Device Independent Bitmap (DIB) frame. Referring to FIG. 4B, there is illustrated an exemplary RGB formatted video frame 420 and a corresponding DIB formatted video frame 430. The RGB formatted video frame 420 may comprise 480 rows (indicated as 422, 423, . . . 425), each row comprising of 480 pixels.

The DIB formatted video frame 430 uses a 40-byte header 432, followed by pixel data that represents an image from a single RGB frame. The pixel data may be organized in 480 rows (indicated as 433, 434, . . . , 435), where each row has a length of 1440 bytes (the product of the horizontal resolution, i.e. 480 pixels, and the byte depth, i.e. 3 bytes). The rows 433, . . . , 435 within the DIB formatted video frame 430 are organized in a bottom up orientation, where the last row in the image (e.g., the last RGB row 425) is stored as the first row 433 in the pixel data of the DIB formatted video frame 430. The size of the resulting DIB formatted video frame 430 may be defined by the product of the width, height and bit depth of the video resolution plus the DIB header (40 bytes). For example, for the RGB formatted video frame 420 (with 480×480 resolution and 3 bytes depth), a corresponding DIB formatted video frame 430 would yield a size of 691240 bytes.

Figure 5A:
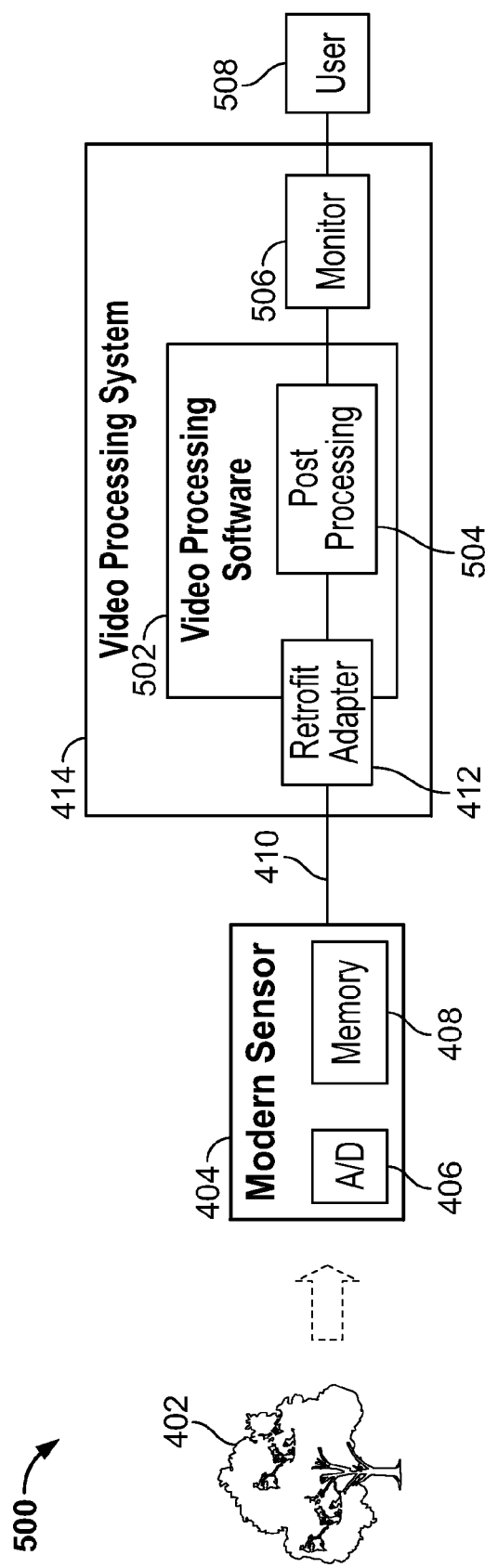
FIG. 5A is an illustration of a video processing system using a high fidelity digital video sensor as a modern video source and a retrofit adapter to legacy video processing software, in accordance with an embodiment of the disclosure.

FIG. 5A is an illustration of a video processing system using a high fidelity digital video sensor as a modern video source and a retrofit adapter to legacy video processing software, in accordance with an embodiment of the disclosure. Referring to FIG. 5A, the video processing system 414 may be running video processing software 502, as part of its operating system. The video processing software 502 may be adapted to provide additional post-processing functions 504 within the video processing system 414, at the direction of a user 508.

In an exemplary operation sequence of the processing environment 500, the modern sensor 404 may sample the objective 402 and may generate HD digital video data using the A/D converter 406. Such data may be encoded/compressed (and packetized) using a digital video format (e.g., by using an H/264/MPEG-4 Part 10 codec), and may be temporarily stored within the on-chip memory 408. The packetized digital video data may then be communicated to the RA 412 within the video processing system 414 via the communication link 410.

In an exemplary embodiment of the disclosure, the communication link 410 between the modern sensor 404 and the RA 412 may be an Ethernet communication link, which allows for an efficient method for transferring packetized digital video data. However, the disclosure may not be limiting in this regard, and other types of communication protocols (e.g., other wired or wireless communication protocols) may also be utilized by the communication link 410.

After the RA 412 receives the packetized digital video data from the modern sensor 404, the RA 412 may decode the packetized digital video data into digital video frames using one or more codecs (e.g., an H/264/MPEG-4 Part 10 codec). The decoding process may generate source video formatted frames (such as, for example, RGB formatted video data). However, the video processing software may be adapted to process destination video formatted data, and not source video formatted frames. In this regard, the source video formatted frames may be further converted by the RA 412 into destination video formatted frames. The resulting destination video formatted frames may be stored in an on-chip memory within the video processing system 414 (e.g., memory 522 in FIG. 5B). The resulting destination video formatted frames may be post-processed by the post-processing functions 504 and/or displayed on the monitor 506 at the direction of the user 508.

In an exemplary embodiment of the disclosure, the destination video formatted digital video frames may be generated by decoding, within the processing device, the packetized digital video into the destination video formatted digital video frames, using the at least one shared library function call. The generating may take place without the converting. In other words, no conversion of the source video formatted frames into the destination video formatted frames may be necessary since the decoded source video formatted frames might already be natively compatible with the video processing system.

Figure 5B:
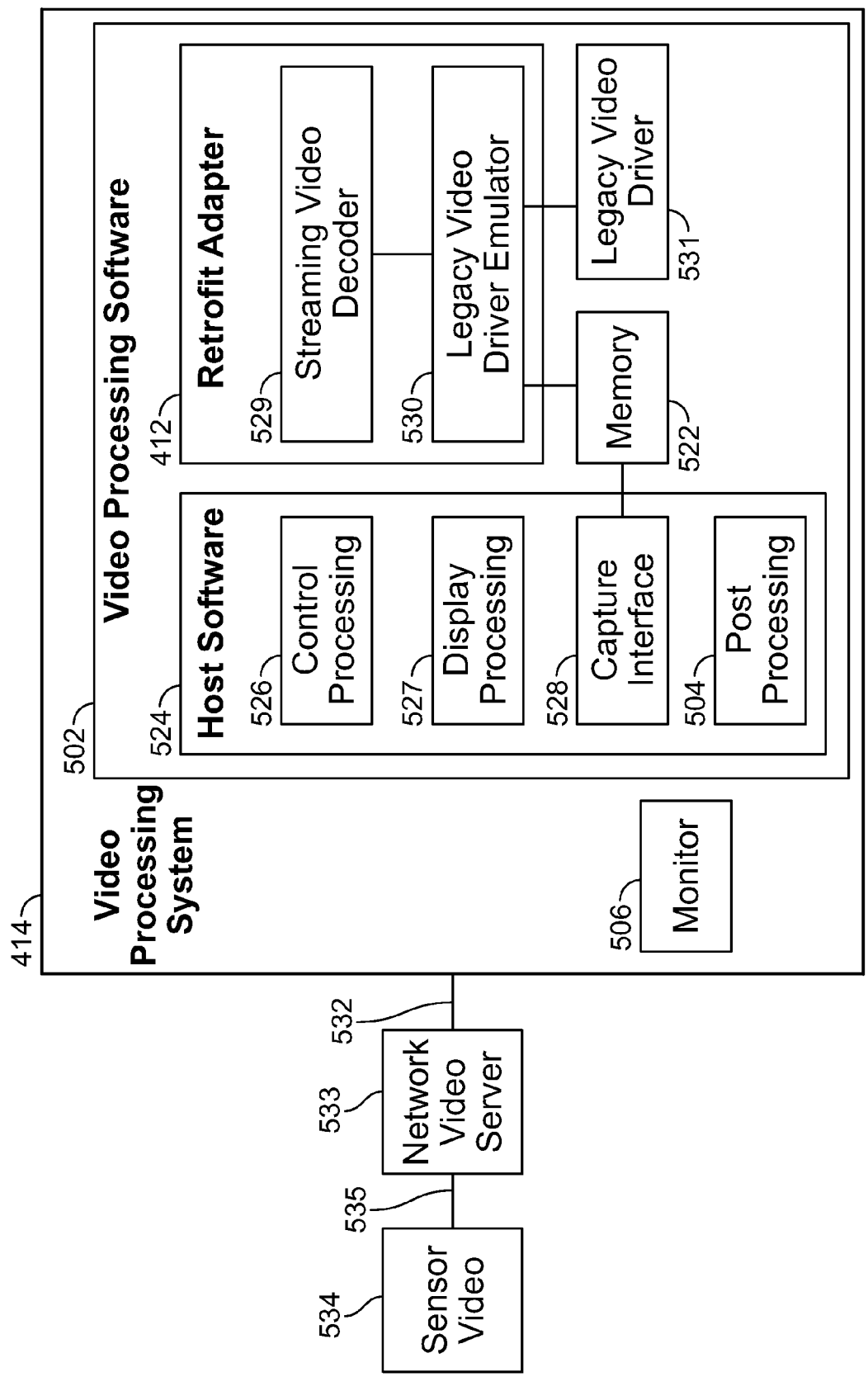
FIG. 5B is an illustration of a video processing system using a retrofit adapter to legacy video processing software, in accordance with an embodiment of the disclosure.

FIG. 5B is an illustration of a video processing system using a retrofit adapter to legacy video processing software, in accordance with an embodiment of the disclosure. Referring to FIG. 5B, the sensor video 534 may comprise packetized digital video data generated by a modern sensor or modern video source (e.g., modern sensor 404). Throughout the specification, the term "modern" in connection with a sensor or a video source in general, indicates the high fidelity capabilities of such video sensor in terms of generating a high definition digital video signal, which may be compressed and communicated to a video processing system for additional processing.

The packetized digital video data of the sensor video 534 may be communicated to a network video server 533 via the wired and/or wireless connection 535. The network video server 533 may comprise a single or multiple network processors (or servers), which may be used to distribute the received packetized digital video data to the video processing system 414 via the wired and/or wireless connection 532.

The video processing software 502 may comprise host software 524, a retrofit adapter (RA) 412, and a legacy video driver 531. The host software 524 may comprise code operable to perform control processing 526, display processing 527, post processing 504, and capture interface 528. The RA 412 may comprise suitable logic, circuitry and/or code and may be adapted to perform streaming video decoder functionality 529 as well as legacy video driver emulator functionality 530 (e.g., any of the functionalities of the capture subsystem 202). In an exemplary embodiment of the disclosure, the RA 412 may use one or more shared library function calls (as described in greater detail herein below in reference to FIGS. 6A-6G) to implement the streaming video decoder functionality 529 and the legacy video driver emulator functionality 530.

Figure 6A:
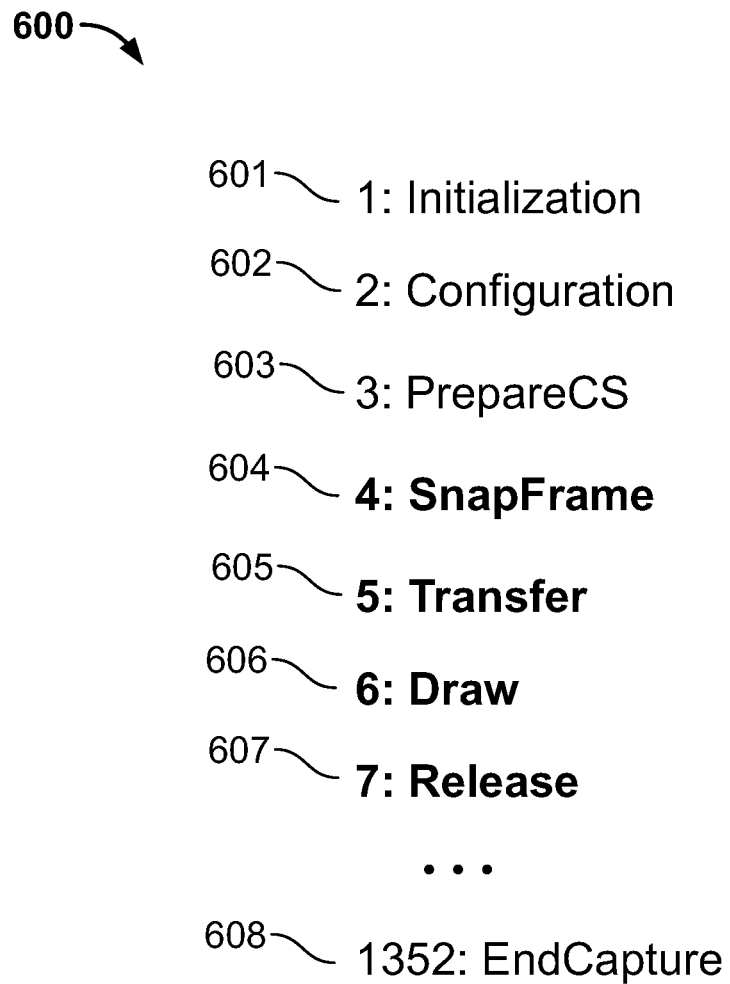
FIG. 6A is a list of a plurality of shared library function calls, which may be used in accordance with an embodiment of the disclosure.

FIG. 6A is a list of a plurality of shared library function calls, which may be used in accordance with an embodiment of the disclosure. Referring to FIGS. 5A-6A, the RA 412 may implement the shared library function calls 601-608 so that it can communicate directly with the legacy components of the video processing software 502. The video processing software 502 may establishes a global memory pointer (e.g., a reference to the starting memory address of the destination video formatted frames stored in the shared memory) to the shared memory 522 for this purpose. In another embodiment of the disclosure, the reference to the starting memory address of the destination video formatted frames may be provided to the video processing software 502.

In FIG. 6A, shared library function calls 601-603 may be used by the RA 412 to provide initialization and configuration commands to the video processing software 502 to prepare it for it for a capture session. The shared library function calls 604-607 (seen in bold print in FIG. 6A) may be used by the RA 412 to accomplish a single capture event of a single video frame from the received packetized digital video data. Also, the shared library function calls 604-607 may be repeated by the RA 412 at the desired rate and length of the session established by the by video processing software 502. Put another way, the shared library function calls 604-607 may be called by the RA 412 for each frame of received packetized digital video data, until all of the received data is processed. The shared library function call 608 on line 1352 may then instruct the RA 412 to end the capture session.

Even though only eight shared library function calls are listed in FIG. 6A, the present disclosure may not be limiting in this regard. The shared library function calls in FIG. 6A may be applicable only for a particular capture subsystem implementation, and may be characteristic only for the communication interface between such capture subsystem and the video processing software 502. In this regard, the exact function call list typical of a given capture subsystem (e.g., capture subsystem 202) is used with a given RA (e.g., RA 412), when the RA (e.g., RA 412) is used to emulate the functionalities of the capture subsystem 202. Other shared library function calls may also be utilized for other types of capture subsystems emulated by the RA 412.

Additionally, the shared library function calls listed in FIG. 6A are generalized versions of the prototyped functions performed by the capture subsystem 202. In this regard, in an exemplary embodiment of the disclosure, only some of the shared library function calls (e.g., shared library function calls 601 and 606) may actually be used by the RA 412 to emulate the capture subsystem functionalities. More specifically, the "initialization" shared library function call 601 and the "draw" shared library function call 606 are used to perform initialization, receiving and decoding of the packetized digital video data (into source video formatted frames), and converting the source video formatted frames to destination video formatted data for use by the video processing software 502. The "initialization" shared library function call 601 and the "draw" shared library function call 606 are discussed in greater detail herein below, in reference to FIGS. 6B-6G.

Other shared library function calls in the list in FIG. 6A (e.g. shared library function calls 602 and 607) may be "Pass Through" function calls, which are "passed through" to (and performed by) the legacy video driver 531. Yet other shared library function calls (e.g., shared library function calls 603-605) may be "Stub" function calls (i.e., they return "success" each time they are called).

Figure 6B:
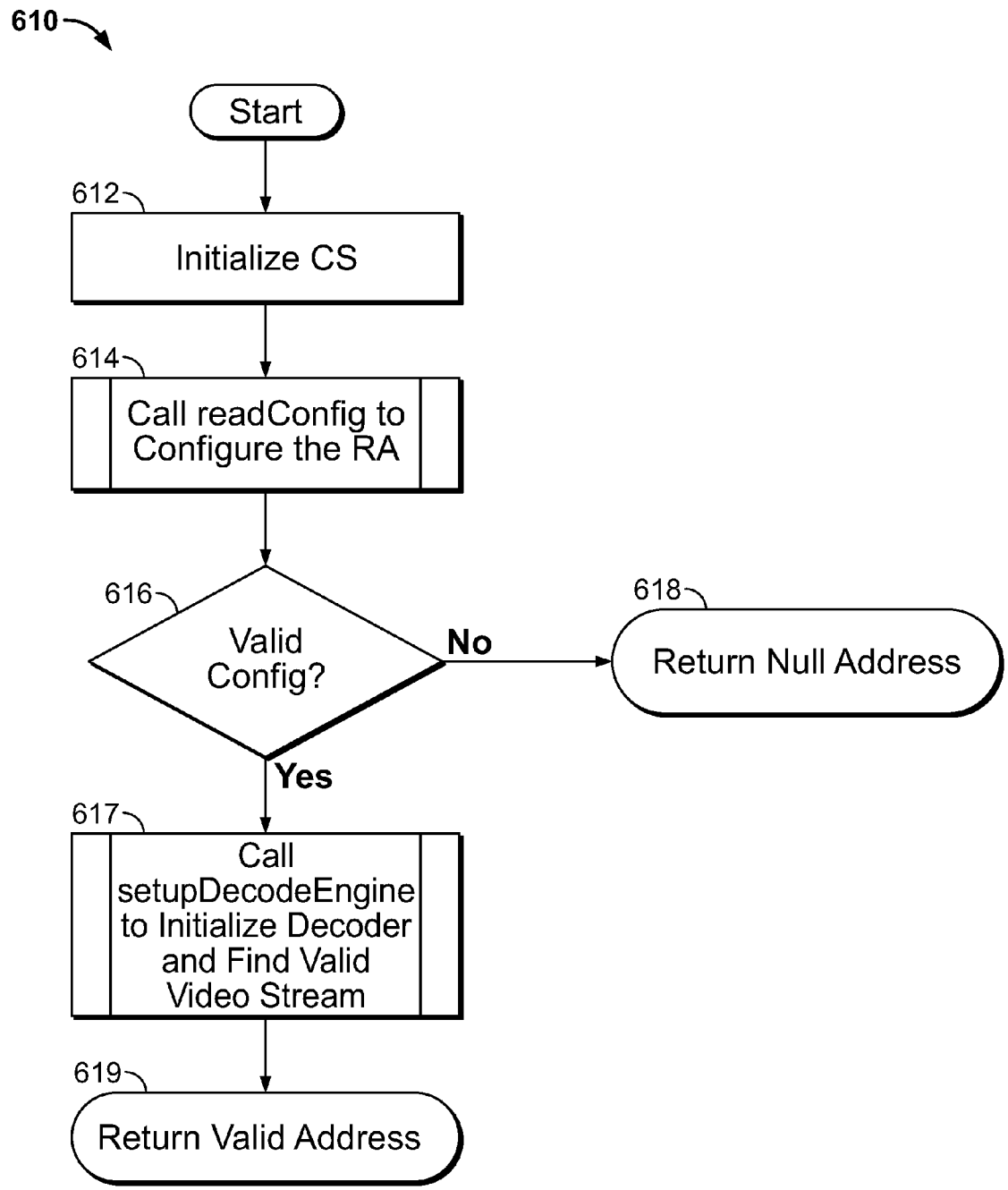
FIG. 6B is illustration of operations performed during an exemplary initialization (Init) shared library function call, in accordance with an embodiment of the disclosure.

FIG. 6B is illustration of operations performed during an exemplary initialization (Init) shared library function call, in accordance with an embodiment of the disclosure. Referring to FIG. 6B, the exemplary operations 610 during an initialization shared library function call of the RA 412 (e.g., Initialization shared library function call 601) may start at step 612 by calling initialization of any available capture subsystem. At 614, the readConfig subroutine (FIG. 6C) may be called to read a configuration flow and configure the RA 412. At 616, it may be determined whether the configuration of the RA 412 is valid. If the configuration of the RA 412 is not valid, then at 618, a null address may be returned. If the configuration of the RA 412 is valid, then the setupDecodeEngine subroutine (FIGS. 6D-6E) may be called to initialize decoding and find a valid video stream. At 619, a valid address may be returned.

Figure 6C:
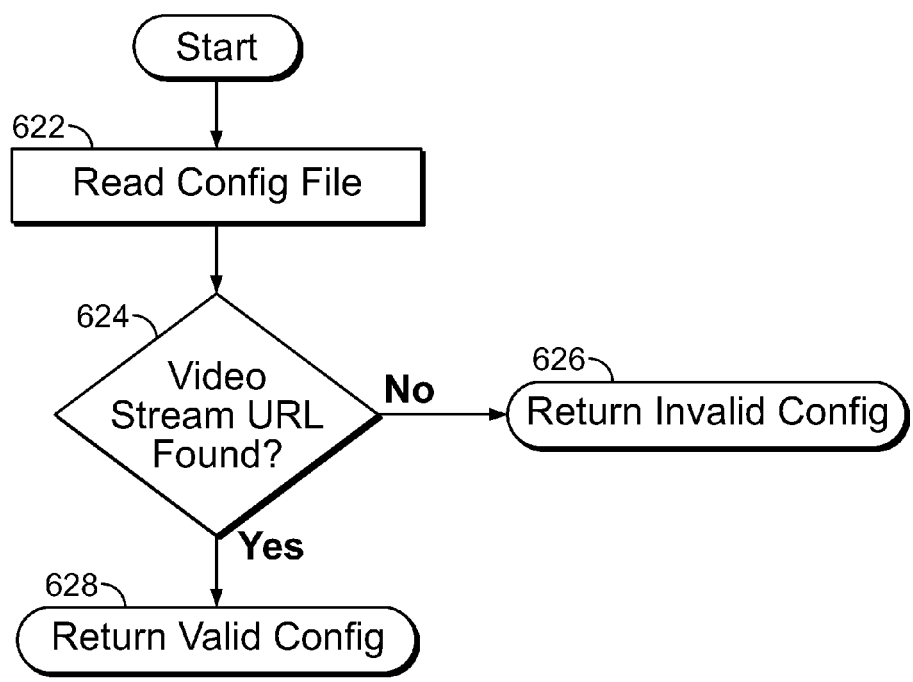
FIG. 6C is illustration of readConfig subroutine, which may be called as part of the initialization shared library function call of FIG. 6B, in accordance with an embodiment of the disclosure.

FIG. 6C is illustration of readConfig subroutine, which may be called as part of the initialization shared library function call of FIG. 6B, in accordance with an embodiment of the disclosure. Referring to FIG. 6C, the readConfig subroutine may start at 622, when a configuration file for the RA 412 may be read. At 624, it may be determined whether a video stream URL is found. If a video stream URL is not found, the subroutine may return an invalid configuration flag at 626. If a video stream URL is found, the subroutine may return a valid configuration flag at 628.

Figure 6D:
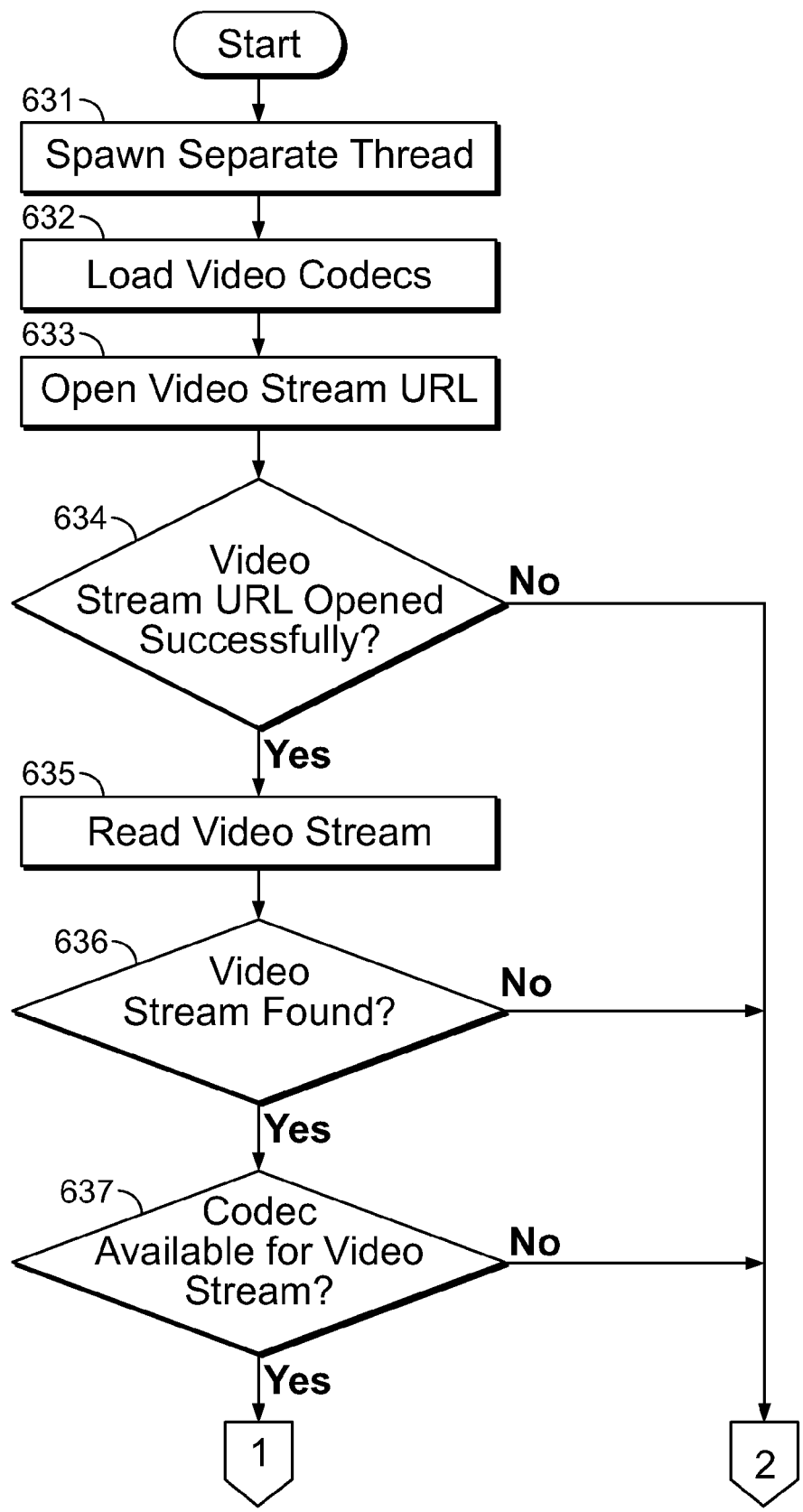
FIGS. 6D-6E are illustrations of setupDecodeEngine subroutine, which may be called as part of the initialization shared library function call of FIG. 6B, in accordance with an embodiment of the disclosure.
Figure 6E:
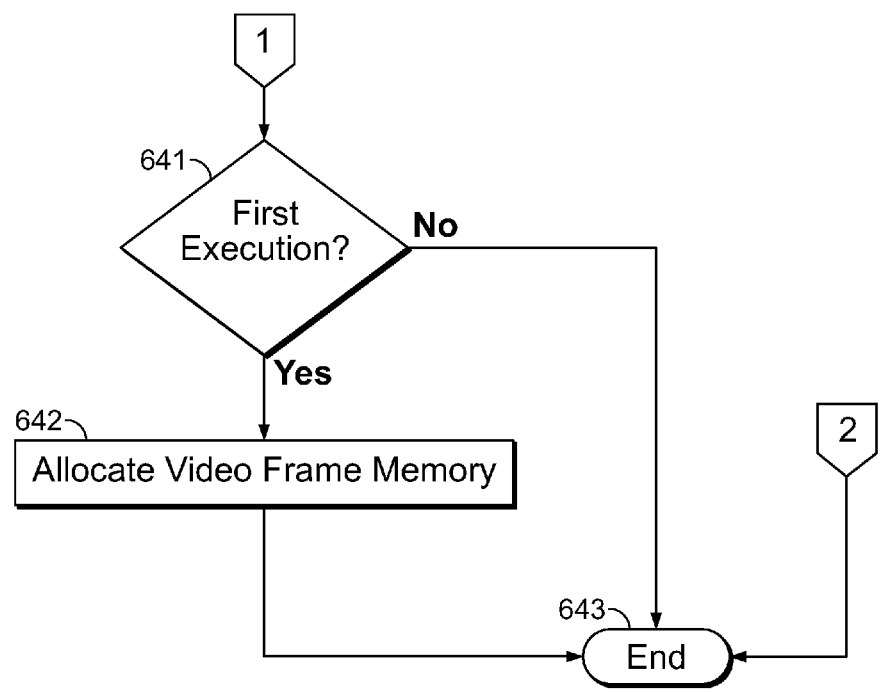

FIGS. 6D-6E are illustrations of setupDecodeEngine subroutine, which may be called as part of the initialization shared library function call of FIG. 6B, in accordance with an embodiment of the disclosure. Referring to FIGS. 6D-6E, the setupDecodeEngine subroutine may start at 631, when a separate thread may be spawned. At 632, video codecs may be loaded. At 633, video stream URL may be opened. At 634, it may be determined whether the video stream URL is opened successfully. If the video stream URL is not opened successfully, then the subroutine may end (at 643 in FIG. 6E). If the video stream URL is opened successfully, then the video stream may be read at 635.

At 636, it may be determined whether a video stream is found at 636. If a video stream is not found, then the subroutine may end (at 643 in FIG. 6E). If a video stream is found, then at 637, it may be determined whether a codec is available for the video stream. If a codec is not available, then the subroutine may end (at 643 in FIG. 6E). If a codec is available, then at 641 it may be determined whether it is a first execution of the subroutine. If it is not the first execution, then the subroutine may end (at 643 in FIG. 6E). If it is the first execution, then at 642, video frame memory may be allocated within the memory 522. The subroutine may then end at 643.

Figure 6F:
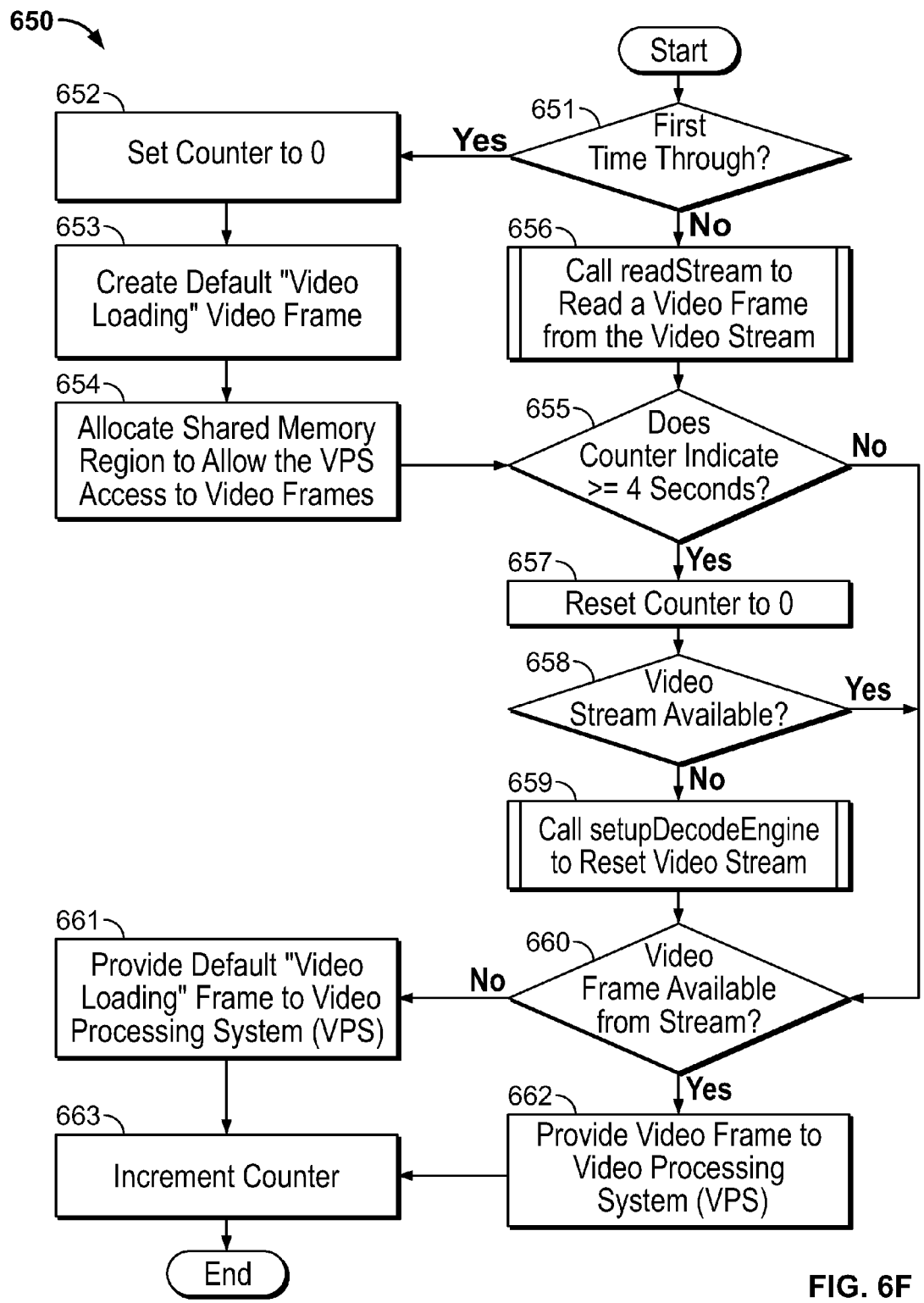
FIG. 6F is illustration of operations performed during an exemplary draw shared library function call, in accordance with an embodiment of the disclosure.

FIG. 6F is illustration of operations performed during an exemplary draw shared library function call, in accordance with an embodiment of the disclosure. Referring to FIG. 6F, the exemplary operations 650 during a Draw shared library function call of the RA 412 (e.g., Draw shared library function call 606) may start at 651, when it may be determined whether it is the first time the Draw shared library function call is being executed. If it is not the first time, then at 656, the readStream subroutine (FIG. 6G) may be executed to read a video frame from the video stream. If is the first time the Draw shared library function call is executed, at 652, a counter may be set to "0". At 653, a default "video loading" video frame may be created.

At 654, on the first call to Draw shared library function call 606, the RA 412 may allocate a block of the memory 522 from the heap, and may associate the allocated memory block with the pointer provided by the video processing software 502 in order to allow access of the video processing software 502 to destination video formatted frames in the memory 522. For every call to the Draw shared library function call 606, the RA 412 may receive and decode packetized digital video data (into source video format), converts into destination video format, and then the RA 412 may store it in destination video format in the memory 522. The memory 522 may be shared between the RA 412 and the host software 524 (and more specifically the capture interface 528), and may be used to transfer the destination video formatted frames from the RA 412 to the capture interface 528 to the VPS. When the function call returns and after the destination video formatted frames is captured by the capture interface 528, it may be post processed by the post processing function 504 and/or displayed by the monitor 506.

At 655, it may be determined whether the counter indicates greater than or equal to 4 seconds. If it does not provide such indication, then processing may resume at 660. If it provides such indication, then at 657 the counter may be reset to 0. At 658, it may be determined whether the video stream is available. If the video stream is available, processing may resume at 660. If the video stream is not available, then setupDecodeEngine subroutine (FIGS. 6D-6E) may be called at 659 to reset the video stream. At 660, it may be determined whether a video frame is available from the stream. If a frame is not available, then at 661, the default "video loading" frame may be provided to the video processing software 502. Processing may then continue at 663. If a frame is available, then at 662 the video frame may be provided to the video processing software 502. At 663, the counter may be incremented and the Draw shared library function call 606 may end.

Figure 6G:
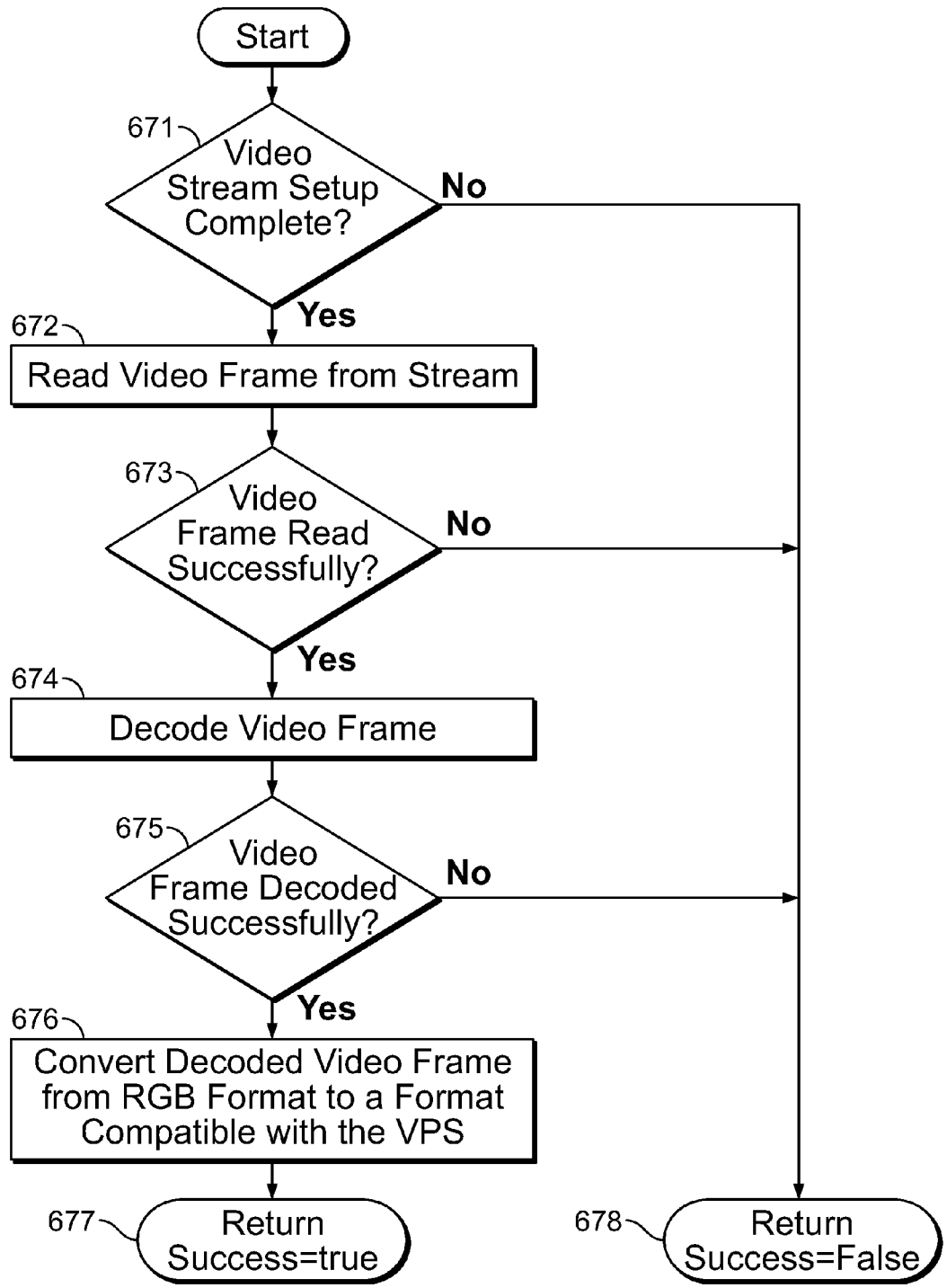
FIG. 6G is illustration of readStream subroutine, which may be called as part of the draw shared library function call of FIG. 6F, in accordance with an embodiment of the disclosure.

FIG. 6G is illustration of readStream subroutine, which may be called as part of the draw shared library function call of FIG. 6F, in accordance with an embodiment of the disclosure. Referring to FIG. 6G, the readStream subroutine may start at 671 when it may be determined whether the video stream setup is complete. If the video stream setup is not complete, the readStream subroutine may return "success=false" flag at 678. If the video stream setup is complete, then at 672 a video frame may be read from the stream.

At 673, it may be determined whether the video frame is read successfully. If the video frame is not read successfully, the readStream subroutine may return "success=false" flag at 678. If the video frame is read successfully, then at 674 the video frame may be decoded (e.g., into a source video format). At 675, it may be determined whether the video frame is decoded successfully. If the video frame is not decoded successfully, the readStream subroutine may return "success=false" flag at 678. If the video frame is decoded successfully, at 676, the decoded video frame may be converted from source video format to a format compatible with the video processing software 502 (e.g., a destination video format, such as a DIB format). The subroutine may then conclude at 677 by returning a "success=true" flag.

Figure 7:
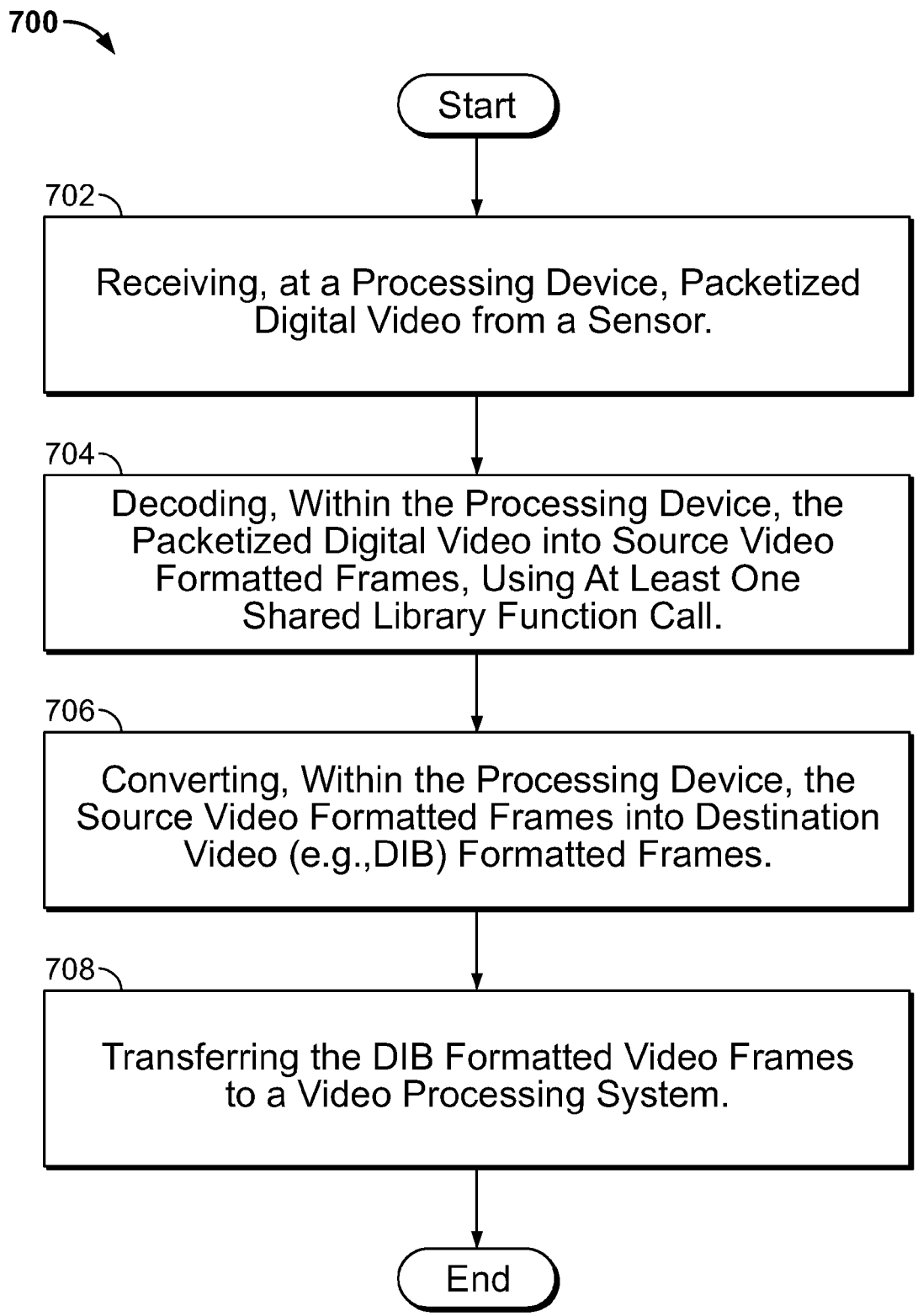
FIG. 7 is illustration of operations performed for retrofit of legacy video processing software to modern video source, in accordance with an embodiment of the disclosure.

FIG. 7 is illustration of operations performed for retrofit of legacy video processing software to modern video source, in accordance with an embodiment of the disclosure. Referring at FIG. 7, the method 700 may start at 702, when packetized digital video may be received from a sensor (e.g., modern sensor 404) at a processing device (e.g., video processing system 414). At 704, the packetized digital video may be decoded, within the processing device into source video formatted frames, using at least one shared library function call (e.g., decoding by the RA 412 using the Draw shared library function call 606). At 706, the source video formatted frames may be converted, within the processing device (e.g., video processing system 414), into destination video formatted frames (e.g., converting performed by RA 412 using the Draw shared library function call 606). At 708, the destination video formatted frames may be transferred to a video processing system (e.g., the destination video formatted frames may be acquired by the capture interface 528).

The destination video formatted frames may be stored, prior to the transferring, in shared memory within the processing device (e.g., the destination video formatted frames may be stored in shared memory 522). The storing of the destination video formatted frames may include allocating at least one memory block of the shared memory (e.g., shared memory 522), and associating the allocated at least one memory block with a memory pointer (e.g., a reference to the starting memory address of the destination video formatted frames stored in the shared memory). The memory pointer may be provided by the video processing system (e.g., the video processing system 414). In another embodiment of the disclosure, the reference to the starting memory address of the destination video formatted frames may be provided to the video processing system.

The destination video formatted frames may be transferred from the allocated at least one memory block (within the shared memory 522) to the video processing system, and then may be post-processed by the video processing system (e.g., by using the post processing function 504). The post-processed transferred destination video formatted frames may be displayed by the video processing system (e.g., by using the monitor 506). The converting of the source video formatted frames into the destination video formatted frames may use the at least one shared library function call (e.g., the shared library function calls 601-608). The converting may include converting the source video formatted frames into a video format compatible with the video processing system (e.g., converting the source video formatted frames to destination video formatted frames by the RA 412). The at least one shared library function call may include at least one of a Initialization function call and a Draw function call (or any other shared library function call listed in FIG. 6A).

Figure 8A:
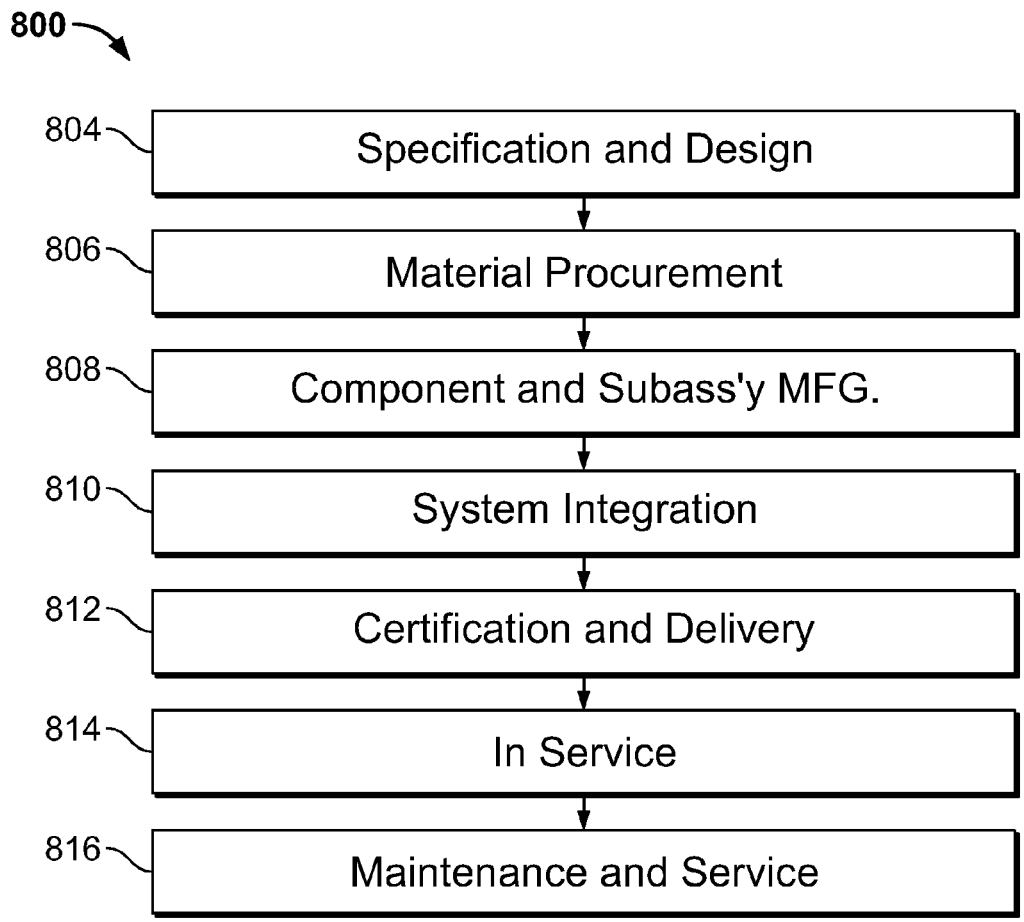
FIG. 8A is a flow diagram of aircraft production and service methodology.
Figure 8B:
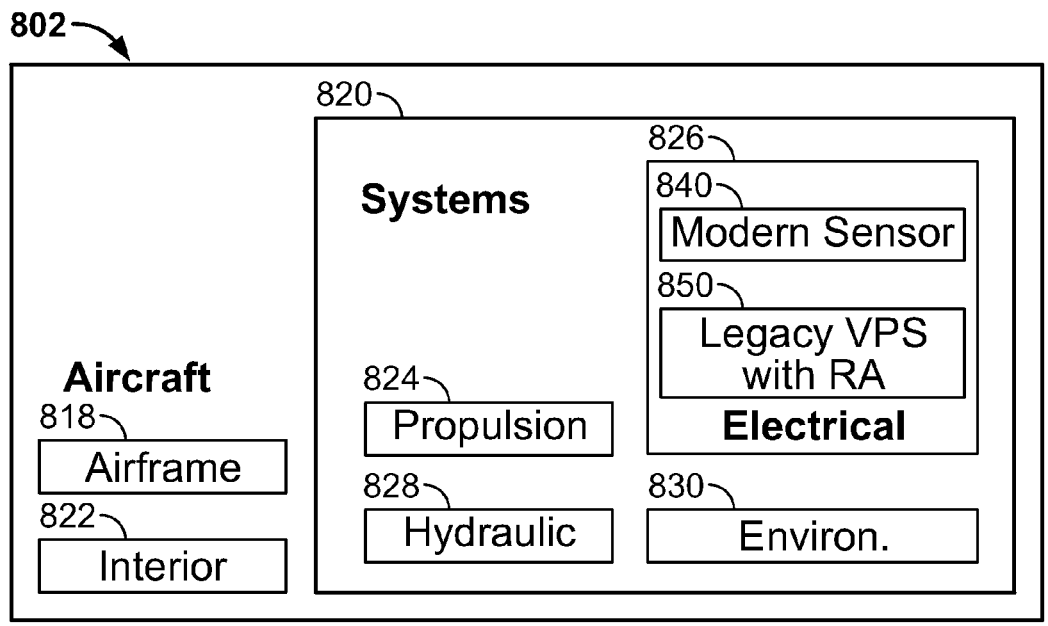
FIG. 8B is a block diagram of an aircraft using a retrofit adapter, in accordance with an embodiment of the disclosure.

FIG. 8A is a flow diagram of aircraft production and service methodology. FIG. 8B is a block diagram of an aircraft using a retrofit adapter, in accordance with an embodiment of the disclosure. Referring more particularly to the drawings, embodiments of the present disclosure may be described in the context of an aircraft manufacturing and service method 800 as shown in FIG. 8A, and an aircraft 802 as shown in FIG. 8B. During pre-production, the exemplary method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 may be scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8B, the aircraft 802 produced by the exemplary method 800 may include an airframe 818 with a plurality of systems 820 and an interior 822. Examples of high-level systems 820 include one or more of a propulsion system 824, an electrical system 826, a hydraulic system 828, and an environmental system 830. The electrical system 826 may comprise, for example, a modern sensor (or another modern video source) 840 and a legacy video processing system (VPS) with a retrofit adapter (RA), collectively 850. The modern sensor 840 may be used for various functionalities, such as navigation and guidance systems employed by the aircraft 802.

The modern sensor 840 and the legacy VPS 850 may be similar in functionality to the modern sensor 404 and the VPS 414, respectively (as described herein above in reference to FIGS. 4A-6G). More specifically, the video processing system 850 may comprise suitable logic, circuitry, interfaces, and/or code and may be adapted to receive via a communication link, HD digital video data directly from the modern sensor 840. The video processing system 850 may further comprise video processing software (e.g., similar to 212 in FIG. 3 or 502 in FIG. 5A), which may use a retrofit adapter (RA) (e.g., similar to RA 412) for processing the HD digital video signals received from the modern sensor 840.

Any number of other systems may be included within the aircraft 802. Although an aerospace example is shown in reference to FIGS. 8A-8B, the principles of the present disclosure may be applied to other industries, such as the automotive industry, medical equipment/devices industry, etc.

Systems and methods embodied herein may be employed during any one or more of the stages of the production and service method 800. For example, the aircraft 802 may be equipped with legacy sensors (e.g., similar to legacy sensor 104) that are adapted to communicate with the VPS 850, and video processing software within the VPS 850 may be used to process video signal received from the legacy sensor. However, during an exemplary maintenance and service operation 816, the aircraft 802 legacy sensor technology may be upgraded with modern sensor technology (e.g., using sensors such as the modern sensor 840) in order to use higher resolution images and improved video signal quality received by the VPS 850. Furthermore, by using a retrofit adapter within the VPS 850, expensive redesigns of the VPS 850 may be avoided, and the VPS 850 may be adapted to process video signal from the modern sensor 840 by using a retrofit adapter, as provided by the present disclosure. In this regard, one or more of the disclosed system embodiments, method embodiments, or a combination thereof, may be utilized while the aircraft 802 is in service, for example and without limitation, to maintenance and service 816.

Certain embodiments of the disclosure may comprise a non-transitory machine-readable medium having stored thereon, a computer program having at least one code section for processing video information, the at least one code section being executable by a machine for causing the machine to perform one or more of the method steps described herein. The machine-readable medium may include, for example, CD/DVD-ROM or any other type of storage medium that is readable by a computer device (e.g., the video processing system 414).

Systems and methods disclosed herein may be used to facilitate the inline replacement of legacy video capture components with higher quality and less constrained video acquisition/distribution components, with minimal impact on an existing legacy video acquisition/processing system.

Accordingly, aspects of the disclosure may be realized in hardware, software, firmware or a combination thereof. The disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present disclosure may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present disclosure may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present disclosure.

While the disclosure has been described with reference to certain embodiments, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for processing video information, the method comprising:
   reading a configuration file associated with a first video processing system using at least one shared library function call, the configuration file comprising data used to configure the first video processing system;
   determining the configuration file comprises a valid source location for a video stream, the source location comprising a uniform resource locator ("URL") of a network;
   receiving, at the first video processing system, packetized digital video from the source location specified in the configuration file in response to determining the configuration file comprises a valid source location for a video stream, the packetized digital video being generated by a first video sensor, the first video processing system configured to process digital video generated by a second video sensor while not being configured to process digital video generated by the first video sensor, the second video sensor having different output characteristics than the first video sensor;
   providing a list of a plurality of shared library function calls used to emulate functionality of a second video processing system configured to process digital video generated using the second video sensor on the first video processing system, the first video processing system comprising one or more of logic, circuitry, interfaces, and code for emulating functionality of the second video processing system, wherein the plurality of shared library function calls comprises one or more pass-through function calls that are performed by the first video processing system and stub function calls that return an indication of successful execution;
   decoding the packetized digital video received from the first video sensor into source video formatted frames using at least one shared library function call of the plurality of shared library function calls, wherein the at least one shared library function call for decoding the packetized digital video into source video formatted frames is called for each frame of the packetized digital video, the at least one shared library function call comprising a draw shared library function call, wherein availability of the video stream is verified for each call of the draw shared library function call by maintaining a counter indicating a number of seconds since a source video formatted frame is received from the video stream, and wherein the video stream is reset in response to the number of seconds since the source video formatted frame is received from the video stream exceeding a threshold time;
   converting the source video formatted frames into destination video formatted frames using at least one shared library function call of the plurality of shared library function calls, the destination video formatted frames having output characteristics such that the destination video formatted frames are displayable by the first video processing system; and
   making available the destination video formatted frames for display by the first video processing system.

2. The method according to claim 1, wherein the at least one shared library function call comprises one or more of a dynamically linked library (DLL) function call and a statically linked library function call.

3. The method according to claim 1, wherein the source video formatted frames comprise RGB formatted digital video frames, and the destination video formatted frames comprise device independent bitmap (DIB) formatted video frames.

4. The method according to claim 1, comprising:
   generating the destination video formatted digital video frames by decoding, within the processing device, the packetized digital video into the destination video formatted digital video frames, using the at least one shared library function call, wherein said generating takes place without said converting.

5. The method according to claim 1, comprising storing the destination video formatted frames in shared memory within the processing device.

6. The method according to claim 5, wherein said storing of the destination video formatted frames comprises:
   allocating at least one memory block of the shared memory; and
   associating said allocated at least one memory block with a memory pointer, wherein said memory pointer is provided by the first video processing system.

7. The method according to claim 6, wherein the destination video formatted frames are transferred from said allocated at least one memory block.

8. The method according to claim 7, further comprising:
   post-processing said transferred destination video formatted frames by the first video processing system; and
   displaying said post-processed transferred destination video formatted frames by the first video processing system.

9. The method according to claim 1, wherein said converting comprises converting the source video formatted frames into a video format compatible with the first video processing system.

10. A non-transitory machine-readable storage medium having stored thereon, a computer program having at least one code section for processing video information, the at least one code section being executable by a machine for causing the machine to perform steps comprising:

reading a configuration file associated with a first video processing system using at least one shared library function call, the configuration file comprising data used to configure the first video processing system;

determining the configuration file comprises a valid source location for a video stream, the source location comprising a uniform resource locator ("URL") of a network;

receiving, at the first video processing system, packetized digital video from the source location specified in the configuration file in response to determining the configuration file comprises a valid source location for a video stream, the packetized digital video being generated by a first video sensor, the first video processing system configured to process digital video generated by a second video sensor while not being configured to process digital video generated by the first video sensor, the second video sensor having different output characteristics than the first video sensor;

providing a list of a plurality of shared library function calls used to emulate functionality of a second video processing system configured to process digital video generated using the second video sensor on the first video processing system, the first video processing system comprising one or more of logic, circuitry, interfaces, and code for emulating functionality of the second video processing system, wherein the plurality of shared library function calls comprises one or more pass-through function calls that are performed by the first video processing system and stub function calls that return an indication of successful execution;

decoding the packetized digital video received from the first video sensor into source video formatted frames using at least one shared library function call of the plurality of shared library function calls, wherein the at least one shared library function call for decoding the packetized digital video into source video formatted frames is called for each frame of the packetized digital video, the at least one shared library function call comprising a draw shared library function call, wherein availability of the video stream is verified for each call of the draw shared library function call by maintaining a counter indicating a number of seconds since a source video formatted frame is received from the video stream, and wherein the video stream is reset in response to the number of seconds since the source video formatted frame is received from the video stream exceeding a threshold time;

converting the source video formatted frames into destination video formatted frames using at least one shared library function call of the plurality of shared library function calls, the destination video formatted frames having output characteristics such that the destination video formatted frames are displayable by the first video processing system; and making available the destination video formatted frames for display by the first video processing system.

11. The non-transitory machine-readable storage medium according to claim 10, wherein the at least one shared library function call comprises one or more of a dynamically linked library (DLL) function call and a statically linked library function call.

12. The non-transitory machine-readable storage medium according to claim 10, wherein the at least one code section comprises code for generating the destination video formatted digital video frames by decoding, within the processing device, the packetized digital video into the destination video formatted digital video frames, using the at least one shared library function call, wherein said generating takes place without said converting.

13. The non-transitory machine-readable storage medium according to claim 10, wherein the at least one shared library function call comprises an Initialization function call.

14. A system for processing video information, the system comprising:

at least one processor within a first video processing system;

a memory comprising code executable by the at least one processor to:

read a configuration file associated with the first video processing system using at least one shared library function call, the configuration file comprising data used to configure the first video processing system;

determine the configuration file comprises a valid source location for a video stream, the source location comprising a uniform resource locator ("URL") of a network;

receive, at the first video processing system, packetized digital video from the source location specified in the configuration file in response to determining the configuration file comprises a valid source location for a video stream, the packetized digital video being generated by a first video sensor, the first video processing system configured to process digital video generated by a second video sensor while not being configured to process digital video generated by the first video sensor, the second video sensor having different output characteristics than the first video sensor;

provide a list of a plurality of shared library function calls used to emulate functionality of a second video processing system configured to process digital video generated using the second video sensor on the first video processing system, the first video processing system comprising one or more of logic, circuitry, interfaces, and code for emulating functionality of the second video processing system, wherein the plurality of shared library function calls comprises one or more pass-through function calls that are performed by the first video processing system and stub function calls that return an indication of successful execution;

decode the packetized digital video received from the first video sensor into source video formatted frames using at least one shared library function call of the plurality of shared library function calls, wherein the at least one shared library function call for decoding the packetized digital video into source video formatted frames is called for each frame of the packetized digital video, the at least one shared library function call comprising a draw shared library function call, wherein availability of the video stream is verified for each call of the draw shared library function call by maintaining a counter indicating a number of seconds since a source video formatted frame is received from the video stream, and wherein the video stream is reset in response to the number of seconds since the source video formatted frame is received from the video stream exceeding a threshold time;

convert the source video formatted frames into destination video formatted frames using at least one shared library function call of the plurality of shared library function calls, the destination video formatted frames having output characteristics such that the destination video formatted frames are displayable by the first video processing system; and make available the destination video formatted frames for display by the first video processing system.

15. The system according to claim 14, wherein the source video formatted frames comprise RGB formatted digital video frames, and the destination video formatted frames comprise device independent bitmap (DIB) formatted video frames.

16. The system according to claim 14, wherein the code is further executable by the processor to generate the destination video formatted digital video frames by decoding, within the processing device, the packetized digital video into the destination video formatted digital video frames, using the at least one shared library function call, wherein said generating takes place without said converting.

17. The system according to claim 14, wherein the code is further executable by the processor to:

store the destination video formatted frames in shared memory within the processing device;

allocate at least one memory block of the shared memory; and associate said allocated at least one memory block with a memory pointer, wherein said memory pointer is provided by the first video processing system.

18. The system according to claim 14, wherein during said converting, the code is further executable by the processor to convert the source video formatted frames into a video format compatible with the first video processing system.

19. The system according to claim 14, wherein said processing device is within an aircraft, and further comprises:

a communication bus; and at least one sensor within the aircraft, the at least one sensor operable to provide video sensor data via the communication bus and wherein said processor within said processing device is operable to receive the video sensor data from the at least one sensor via the communication bus.

\* \* \* \* \*